(12) United States Patent
Roeder (10) Patent No.: US 8,465,073 B2
(45) Date of Patent: Jun. 18, 2013

(54) PANEL ASSEMBLY FOR AN ANIMAL TRANSPORT VEHICLE

(75) Inventor: Matt Roeder, Odebolt, IA (US)

(73) Assignee: Lundell Plastics Corporation, Odebolt, IA (US)

( * ) Notice: Subject to any disclaimer, the term of this patent is extended or adjusted under 35 U.S.C. 154(b) by 231 days.

(21) Appl. No.: 12/720,805

(22) Filed: Mar. 10, 2010

(65) Prior Publication Data

US 2011/0221220 A1 Sep. 15, 2011

(51) Int. Cl.
*B62D 33/04* (2006.01)

(52) U.S. Cl.
USPC ............... 296/24.31; 296/186.5; 296/191; 119/405

(58) Field of Classification Search
USPC .......... 296/24.31, 183.1, 186.1, 186.4, 186.5, 296/191, 39.1, 1.06, 186.2, 184.1; 119/405; 52/461, 464
See application file for complete search history.

(56) References Cited

U.S. PATENT DOCUMENTS

| | | | | |
|---|---|---|---|---|
| 1,060,981 A | * | 5/1913 | Haymes | 119/405 |
| 1,361,896 A | * | 12/1920 | Norman | 105/378 |
| 2,934,371 A | * | 4/1960 | Warren | 52/581 |
| 3,097,877 A | * | 7/1963 | Erlandsen | 296/182.1 |
| 3,116,950 A | * | 1/1964 | Chieger et al. | 296/184.1 |
| 4,437,699 A | * | 3/1984 | Lewis et al. | 296/186.1 |
| 4,470,231 A | | 9/1984 | Lewis | |
| 5,069,357 A | * | 12/1991 | Anderson | 220/787 |
| 5,351,990 A | * | 10/1994 | Thomas | 280/789 |
| 5,480,180 A | * | 1/1996 | Fuller et al. | 280/656 |
| 5,664,826 A | * | 9/1997 | Wilkens | 296/186.1 |
| 6,224,142 B1 | * | 5/2001 | McCormack | 296/191 |
| 6,988,761 B1 | * | 1/2006 | Stidham et al. | 296/186.1 |
| 2007/0102961 A1 | * | 5/2007 | Lemmons | 296/186.1 |

* cited by examiner

*Primary Examiner* — Jason S Morrow
(74) *Attorney, Agent, or Firm* — Brick Gentry PC; Brian J. Laurenzo; Jessica Susie (57) ABSTRACT

A panel assembly is provided comprising a first face having an outer perimeter and a second face having an outer perimeter, the second face being directly opposite the first face and having a substantially smooth surface, the first and second faces forming a first panel thickness. A plurality of borders surround the perimeters of the first and second faces. At least one support member is attached and arranged perpendicular to the first face, the at least one support member extending parallel to at least one border, the at least one support member and the second face forming a second panel thickness, the second panel thickness is greater than the first panel thickness.

21 Claims, 5 Drawing Sheets

PANEL ASSEMBLY FOR AN ANIMAL TRANSPORT VEHICLE

FIELD OF THE INVENTION

The present invention relates to transportation of animals. More specifically, the present invention relates to a panel assembly for attachment to an animal transport.

BACKGROUND

Vehicles for transporting animals are known. An animal transportation vehicle may include any single or combination of vehicles adapted to transport animals. For example, an animal transportation vehicle may include a motorized, unitary vehicle having an area for transporting one or more animals. An animal transportation vehicle may also include a non-motorized trailer assembly adapted to be selectively attached and pulled behind a motorized vehicle, such as a truck, farm tractor or road tractor.

Generally, these animal transportation vehicles include walls surrounding the perimeter of the vehicle connected to a roof. The walls and roof enclose the transportation vehicle to confine the animals during transportation.

Often the walls of an animal transportation vehicle include one or more openings to the environment outside of the vehicle. The openings may take the form of one or more holes, slats, or other suitable shape. The openings provide access to the enclosed animals and a source of ventilation during transportation. Further, during periods of higher temperature weather conditions, the openings provide airflow, resulting in a cooling source to maintain the body temperatures of animals during transportation.

However, during periods of lower temperature or adverse weather conditions, the openings may become detrimental to the well-being of the animals during transportation. Cold air and/or precipitation may penetrate into the animal transportation vehicle. The resulting exposure may adversely effect animal comfort and can lead to cold-related injuries, including, but not limited to, frostbite, hypothermia, or death.

There are currently few devices available to block or cover the one or more openings in the animal transportation vehicle. Further, each option includes undesirable secondary effects.

For example, one available option is to install plugs into each of the openings in the animal transportation vehicle. However, plugs are time consuming to install, as each individual opening must receive a plug and each vehicle often includes hundreds of openings. In addition, plugs include surfaces that can accumulate saliva, feces or other biological materials emitted from animals. The materials may include bacteria, infectious agents, disease, or other maladies which can be transmitted between animals and geographic locations. Further, plugs are not easy to clean. Each plug must be individually removed from the corresponding opening and individually treated or cleaned. Accordingly, plugs can pose a biological security risk to healthy animals transported and subsequently exposed to the contaminated biological material. For example, biological security is especially important when transporting food source animals, such as livestock. Biological contamination can lead to infection of consumers of the animals, including humans.

Another available option is to attach or install one or more corrugated sheets onto the animal transportation vehicle to cover one or more of the openings. The corrugated sheets may be made of plastic, metal or other suitable material. However, the corrugations form one or more uneven surfaces or open profiles where biological material can accumulate, posing a biological security risk to animals or animal consumers.

Another existing option available to cover the openings of an animal transportation vehicle is to attach or install one or more solid sheets to the animal transportation vehicle. The solid sheets may be made of plastic, metal or other suitable material. However, solids sheets which have the necessary thickness to functionally block the openings in the animal transportation vehicle add a significant amount of weight to the animal transportation vehicle. In turn, the animal transportation vehicle be forced to reduce the number of animals on the vehicle to meet transportation weight restrictions. The additional weight can also lead to additional hazards to the vehicle driver, animals or surrounding motorists during transportation due to increased breaking distance, reduced vehicle handling or other adverse effects caused from a heavy or overweight vehicle. In addition, the animal transportation vehicle may qualify as an oversize or overweight load, which may result in transportation restrictions including, but not limited to, special licensing, lights or signals on the vehicle, and/or pilot and trailing vehicles. Further, the solid sheets are often flexible or malleable, leading to difficulties handling and securing the sheets during attachment on the vehicle.

Accordingly, a device that can cover one or more openings on an animal transportation vehicle which is fast and easy to install is provided. Further, the device may be biologically secure by not having a surface which can accumulate biological material. In addition, the device may be easy to clean. Further, the device may be light in weight, yet has sufficient rigidity to provide for easy handling of the device.

SUMMARY OF THE INVENTION

A panel assembly is provided comprising a first face having an outer perimeter and a second face having an outer perimeter, the second face being directly opposite the first face and having a substantially smooth surface, the first and second faces forming a first panel thickness. A plurality of borders surround the perimeters of the first and second faces. At least one support member is attached and arranged perpendicular to the first face, the at least one support member extending parallel to at least one border, the at least one support member and the second face forming a second panel thickness, the second panel thickness is greater than the first panel thickness.

In another embodiment of a panel assembly, the assembly includes a panel having a first side and a second side, the first and second sides being directly opposed to each other and form a wall of a first thickness. A first border extends along a first portion of a perimeter of the panel and a second border extends along a second portion of the perimeter of the panel, the second border is parallel to the first border. A plurality of spaced apart protrusions are integrally formed with and arranged perpendicular to the first side of the panel, the protrusions extend along the first side of the panel parallel to the first and second borders, the panel and protrusions form a segment of a second thickness, the second thickness being greater than the first thickness.

In another embodiment of a panel assembly, the assembly includes a panel having a front face and a rear face having an outer perimeter, a first border and a second border. The first and second borders arranged parallel to each other, the front and rear faces oppose each other, the rear face having a substantially smooth surface, and the panel has a first thickness formed between the front and rear faces. A plurality of protrusions are integrally formed with and arranged perpendicular to the front face of the panel. The protrusions extend along the front face of the panel parallel to the first and second borders, each of the plurality of protrusions are spaced apart from each other. A segment of the panel has a second thickness formed between the rear face and a protrusion, the second thickness is greater than the first thickness.

DETAILED DESCRIPTION

The following presents one or more examples of embodiments of a panel assembly 100. For ease of discussion and understanding, the following detailed description and illustrations refer to the panel assembly 100 for use with an animal transportation vehicle 200 illustrated as an animal or livestock trailer. It should be appreciated that the "trailer" is provided for purposes of illustration, and the panel assembly 100 may be used with any type, style, or arrangement of transportation vehicle which may transport animals. Further, "animals" is provided for purposes of illustration, and may include, but is not limited to, domesticated animals, wild animals, livestock, birds, or any other animal requiring transport from one location to another location. In addition, it should be appreciated that the panel assembly 100 and associated features may be integrally formed or separately attached.

Figure 1:
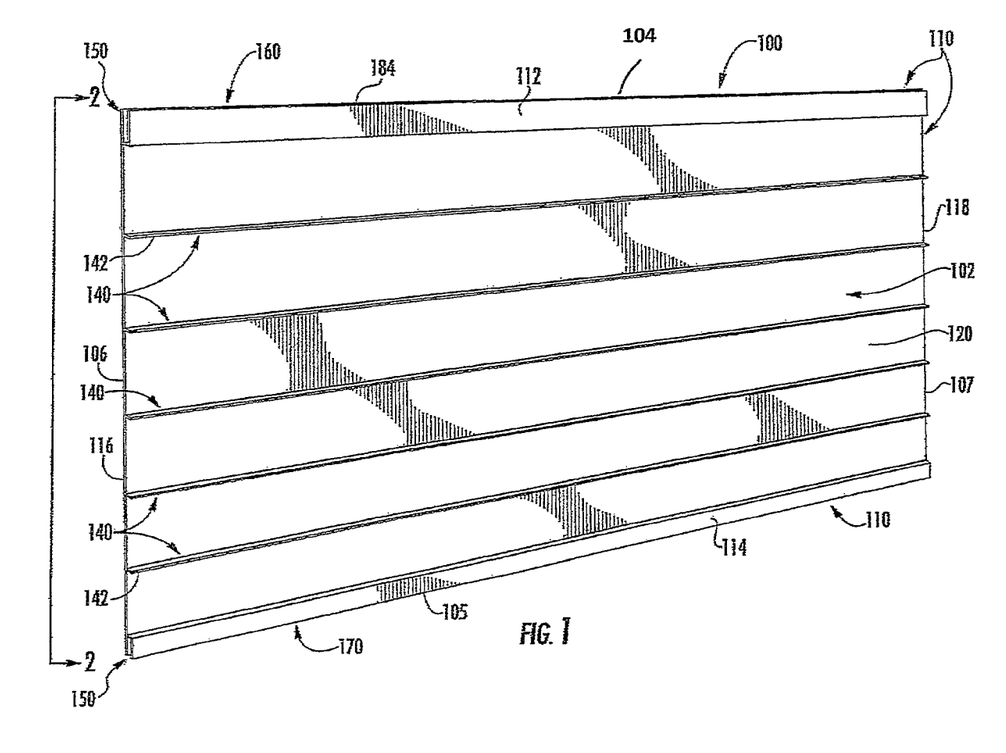
FIG. 1 is an isometric view of a panel assembly in an embodiment of the present invention, illustrating a first side of the panel assembly.
Figure 2:
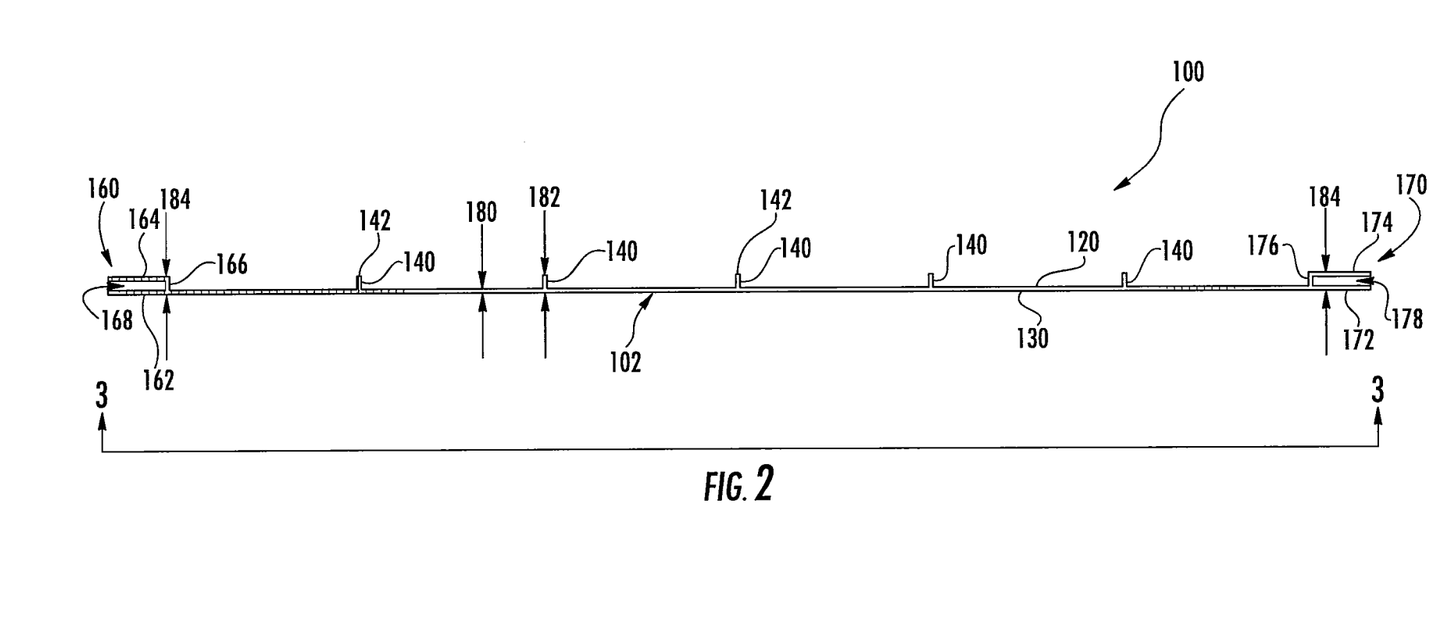
FIG. 2 is an end view of the panel assembly of FIG. 1, taken along line 2-2 of FIG. 1.
Figure 3:
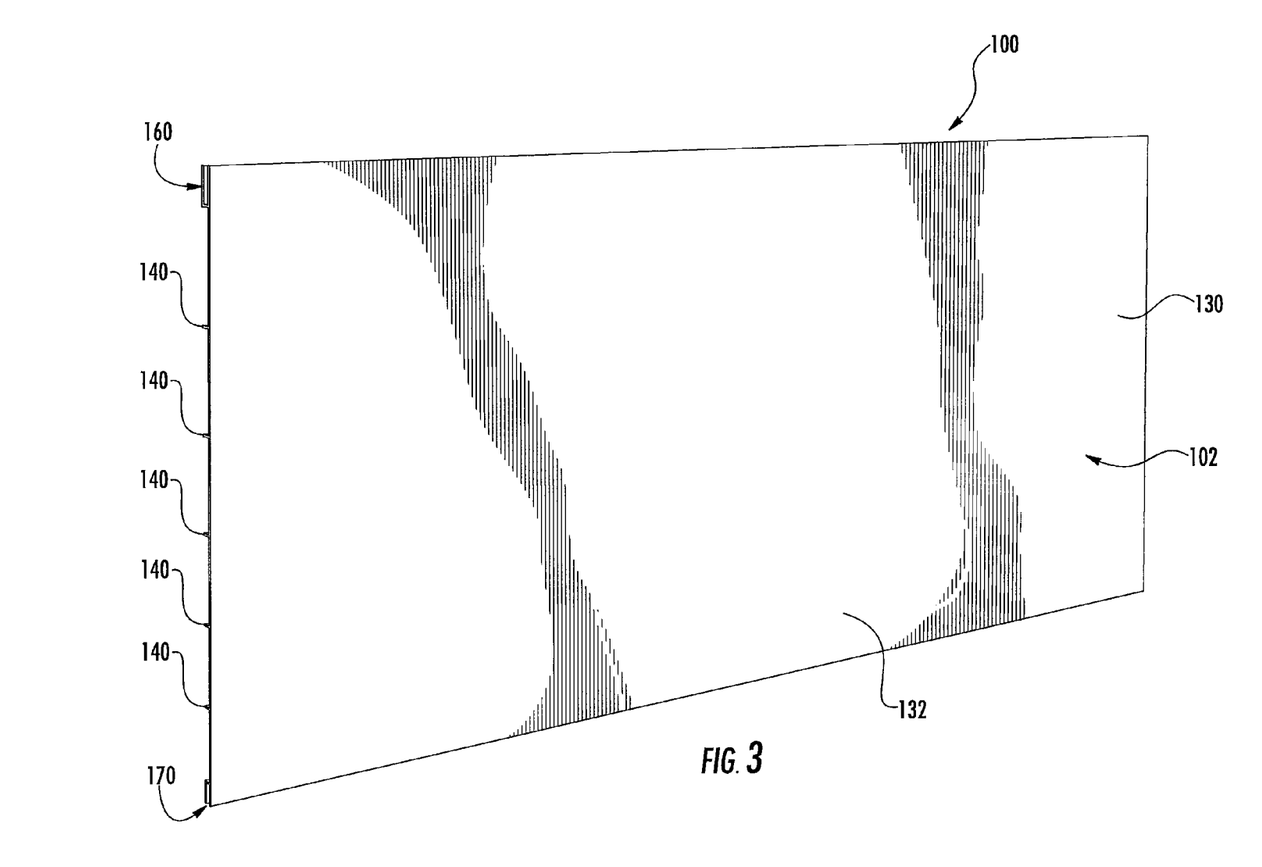
FIG. 3 is an isometric view of the panel assembly of FIG. 1, illustrating a second side of the panel assembly and taken along line 3-3 of FIG. 2.
Figure 4:
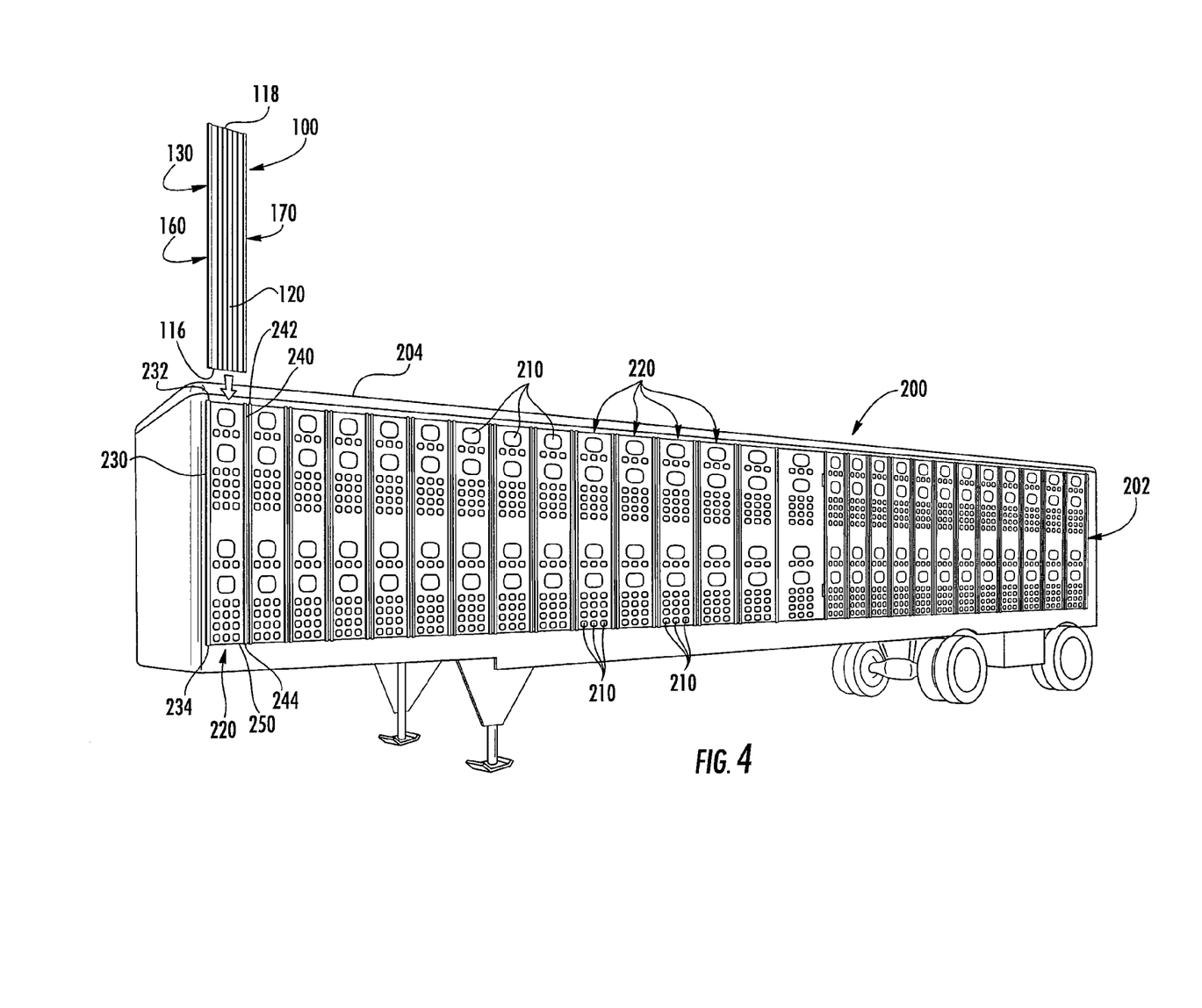
FIG. 4 is an isometric view of an animal transportation vehicle adapted to receive the panel assembly of FIG. 1.

FIGS. 1, 2 and 3 illustrate a panel assembly 100 in accordance with one or more examples of embodiments of the present invention. As shown in the FIGS. 1-3, the panel assembly 100 is illustrated to be generally rectangular in shape, but it is contemplated that the panel assembly 100 may be triangular, circular, polygonal, or of any other suitable shape to cover or block one or more openings in an animal transportation vehicle 200 without departing from the overall scope of the present invention. The illustrated panel assembly 100 is generally longer in length, as shown by first edge 104 and second edge 105, than width, as shown by a third edge 106 and a fourth edge 107, but it is contemplated that the panel assembly 100 may be formed of any arrangement of length and width without departing from the overall scope of the present invention. For example, the illustrated panel assembly 100 may have a length ranging from twelve (12) inches to one hundred ninety two (192) inches, and more preferably approximately ninety-six (96) inches, and a width ranging from eight (8) inches to thirty-six (36) inches, and more preferable approximately eighteen (18) inches. Preferably, a single panel assembly 100 covers a plurality of openings 210 along a portion of an animal transportation vehicle 200, as shown in FIG. 4. However, in one or more examples of embodiments, the panel assembly 100 may be any combination of length, width or size to cover one or more openings 210 in an animal transportation vehicle 200. The above described length and width is listed for exemplary purposes only and is not intended to be limiting. The panel assembly 100 is formed of high density polyethylene. In one or more examples of embodiments, the panel assembly 100 may be formed of a high molecular weight (HMW) or ultra high molecular weight (UHMW) thermoplastic polymer, metal, or any other known or future developed material or manufacturing process having sufficient strength and durability to be corrosion, impact, and abrasion resistant while covering one or more openings of an animal transportation vehicle 200 in accordance with the present invention.

The panel assembly 100 may include a panel or wall 102 having a plurality of ends or end portions or borders 110. As illustrated in FIGS. 1-3, the plurality of borders 110 includes a first end or first end portion or first border 112, a second end or second end portion or second border 114, a third end or third end portion or third border 116, and a fourth end or fourth end portion or fourth border 118 forming the perimeter of the assembly 100. As shown in FIGS. 1-3, the first border 112 and second border 114 of the panel assembly 100 are generally parallel to one another and extend generally longitudinally along the length formed by edges 104, 105 of the panel assembly 100. The third border 116 and fourth border 118 are also generally parallel to one another and extend generally longitudinally along the width formed by edges 106, 107 of the panel assembly 100. The first border 112 and second border 114 may be spaced apart from each other by the third border 116 and fourth border 118. As illustrated, the first and second borders 112, 114 are adjacent to and arranged approximately perpendicular to the third and fourth borders 116, 118. In one or more examples of embodiments, the panel assembly 100 may include three, or five or more ends or borders 110 in accordance with the shape of the assembly 100. Further, in one or more examples of embodiments, adjacent ends or borders 110 of the panel assembly 100 may be arranged at acute or obtuse angles to one another.

Referring to FIGS. 1 and 2, the panel assembly 100 includes a first face or first side or front face 120. As illustrated in FIG. 4, once installed, the first face 120 is adapted to face away from or toward the environment outside of an animal transportation vehicle 200.

Referring to FIGS. 2 and 3, the panel assembly 100 also includes a second face or second side or rear face 130. As shown in FIG. 2, the first face 120 and second face 130 are arranged on opposing sides of the panel assembly 100. As illustrated by comparing of FIGS. 1 and 3, the second face 130 includes a substantially flat or smooth surface 132. Further, as illustrated in FIG. 4, once installed, the second face 130 is adapted to face toward the inside or containment area of an animal transportation vehicle 200. In one or more examples of embodiments, the panel assembly 100 may be installed such that the second face 130 is adapted to face away from or toward the environment outside of an animal transportation vehicle 200.

The panel assembly 100 includes one or more bars or rib members or support members or protrusions or segments 140. Referring to FIGS. 1 and 2, the bars 140 are arranged or positioned on the first face 120 of the panel assembly 100. As illustrated, the bars 140 are arranged approximately orthogonal or perpendicular to the first face 120 and extend parallel to the first and second borders 112, 114 of the panel assembly 100. The bars 140 may include an end or tip or face portion 142. In one or more examples of embodiments, the bars 140 extend perpendicular in relation to, at acute angles in relation to or at obtuse angles in relation to the first and second borders 112, 114. In one or more examples of embodiments, the bars 140 may extend parallel to the third and fourth borders 116, 118 of the panel assembly 100. Further, in one or more examples of embodiments, the panel assembly 100 may include one bar 140 or a plurality of bars 140. The bars 140 may be integrally formed into the panel assembly 100, for example, through extrusion. In one or more examples of embodiments, however, the bars 140 may be connected to the panel assembly 100 by any known or future developed forming method, adhesive, or attachment method, including, but not limited to, pressing, blow molding, injection molding, application of adhesive or attachment with screws or bolts. While the bars 140 are illustrated as rectangular in shape, the bars 140 may be formed of other shapes, including, but not limited to, semi-cylindrical, polygonal, or any other known or suitable shape in accordance with the present invention.

The panel assembly 100 may include one or more panel attachment devices 150. In one or more examples of embodiments, the panel assembly 100 may include a plurality of panel attachment devices 150, dependent upon factors including, but not limited to, the shape, size or orientation of the panel assembly 100, or the arrangement and number of openings on the associated animal transportation vehicle 200. Further, in one or more examples of embodiments, the panel assembly 100 may not include any panel attachment device 150. In such an arrangement, the panel assembly 100 may attach to or engage the animal transportation vehicle 200 by one or more attachment devices (not shown), including, but not limited to, a clip, bolt, hook or other known or future developed attachment device or fastener suitable for removably connecting the panel assembly 100 to an animal transportation vehicle 200.

As shown in FIGS. 1-3, the illustrated panel assembly 100 includes two panel attachment devices 150, a first panel attachment array 160 and a second panel attachment array 170. The first and second panel attachment arrays 160, 170 may be integrally formed into the panel assembly 100. The first and second panel attachment arrays 160, 170 may be formed of the same materials as the panel assembly 100. In one or more examples of embodiments, however, the first and second panel attachment arrays 160, 170 may be connected to the panel assembly 100 by any known or future developed forming method, adhesive, or attachment method, including, but not limited to, pressing, blow molding, injection molding, application of adhesive or attachment with screws or bolts. Further, in one or more examples of embodiments, the first and second panel attachment arrays 160, 170 may be formed of a high molecular weight (HMW) or ultra high molecular weight (UHMW) thermoplastic polymer, metal, or any other known or future developed material or manufacturing process having sufficient strength and durability to be corrosion, impact, and abrasion resistant while attaching the panel assembly 100 to an animal transportation vehicle 200 in accordance with the present invention.

The first panel attachment array 160 is connected to or positioned on the first border 112 of the panel assembly 100. Referring specifically to FIG. 2, the first panel attachment array 160 includes a first attachment member 162 and a second attachment member 164. The first and second attachment members 162, 164 are substantially parallel to one another and are connected by a third attachment member 166. The third attachment member 166 is approximately orthogonal or perpendicular to the first and second attachment members 162, 164. Further, the third attachment member 166 separates the first and second attachment members 162, 164 to form a first channel or first conduit or first groove 168. A second panel attachment array 170 is connected to or positioned on the second border 114 of the panel assembly 100. The second panel attachment array 170 includes a fourth attachment member 172 and a fifth attachment member 174. The fourth and fifth attachment members 172, 174 are substantially parallel to one another and are connected by a sixth attachment member 176. The sixth attachment member 176 is approximately orthogonal or perpendicular to the fourth and fifth attachment members 172, 174. Further, the sixth attachment member 176 separates the fourth and fifth attachment members 172, 174 to form a second channel or second conduit or second groove 178. In one or more examples of embodiments, the first and second attachment members 162, 164 may be arranged at an acute or obtuse angle to the third attachment member 166 to form the first channel 168. Further, in one or more examples of embodiments, the third and fourth attachment members 172, 174 may be arranged at an acute or obtuse angle to the sixth attachment member 176 to form the second channel 178.

As illustrated in FIG. 2, the panel assembly 100 includes a first thickness or first depth or first height or first panel thickness 180, defined by the cross-sectional distance of the panel or wall 102 between the first and second faces 120, 130. Each of the one or more bars 140 have a second thickness or second depth or second height or second panel thickness 182, defined by the cross-sectional distance of a segment of the panel assembly 100 between the second face 130 and the end 142 of the bar 140. The second thickness 182 is greater than the first thickness 180. For example, the illustrated panel assembly 100 may have a first thickness ranging from 0.03 inches to 0.125 inches, and more preferably approximately 0.06 inches, and a second thickness ranging from 0.05 inches to 0.75 inches, and more preferably approximately 0.31 inches. The above described first and second thicknesses 180, 182 is listed for exemplary purposes only and is not intended to be limiting.

Referring to FIG. 2, the panel assembly 100 may also include a third wall thickness or third depth or third height or third panel thickness 184, defined by the cross-sectional distance of a segment of the panel assembly 100 between the first and second attachment members 162, 164 and/or the fourth and fifth attachment members 172, 174 of the panel assembly 100. The third thickness 184 is greater than the first thickness 180. Further, as illustrated, the third thickness 184 is equal to the second thickness 182. In one or more examples of embodiments, the third thickness may be less than or greater than the second thickness 182. Further, in one or more examples of embodiments, the panel assembly 100 may not include a third thickness 184 should the panel assembly 100 not include a panel attachment device 150.

In operation and use of one or more examples of the panel assembly 100, engagement and disengagement of the panel assembly 100 from an animal transportation vehicle 200 may be accomplished by manual installation of the panel assembly 100. FIG. 4 illustrates an animal transportation vehicle 200 having a plurality of openings 210. The openings in the illustrated example are arranged in a plurality of vertical strips or corridors or bands 220 extending along the exterior 202 of the animal transportation vehicle 200. Each of the vertical strips 220 may include a first rail or first track 230 and a second rail or second track 240. The first and second rails 230, 240 may be arranged parallel to one another and extend vertically along the exterior of the animal transportation vehicle 200. The first rail 230 may include a first end 232 and a second end 234. The second rail 240 may include a first end 242 and a second end 244. A lip or retention bar 250 may be attached to the exterior 202 of the animal transportation vehicle 200 and extend between the first and second rails 230, 240. For example, as illustrated in FIG. 4, the lip 250 may extend a distance between the first and second rails 230, 240 near the second ends 234, 244. Further, the lip 250 may extend a distance away from the exterior 202 of the animal transportation vehicle 200. The lip 250 extends away from the exterior wall of the animal transportation vehicle 200 a distance sufficient to restrict the movement of the panel assembly 100. The first and second rails 230, 240 are adapted to engage a portion of the panel assembly 100, specifically the panel attachment devices 150. In one or more examples of embodiments, the first and second rails 230, 240 may extend horizontally along a portion of the exterior of the animal transportation vehicle 200. Further, in one or more examples of embodiments, the first and second rails 230, 240 may extend vertically along a portion of the exterior of the animal transportation vehicle 200.

Figure 5:
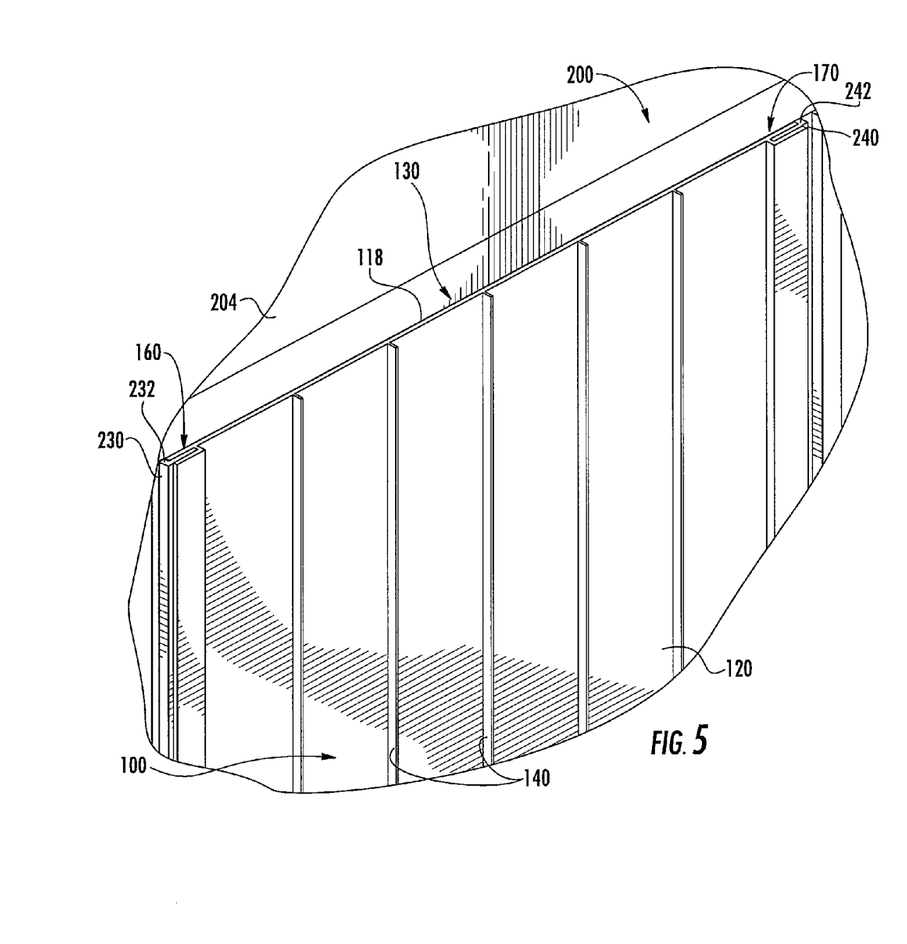
FIG. 5 is a partial isometric view of the panel assembly of FIG. 1, having portions removed to show the animal transportation vehicle shown in FIG. 4 receiving the panel assembly.

As illustrated in FIGS. 4 and 5, to install the panel assembly 100, a user inserts the third border 116 into the opening formed between the first and second rails 230, 240 and aligning the first and second rails 230, 240 with the first and second channels 168, 178 formed in the first and second panel attachment arrays 160, 170. The user then slides the panel assembly 100 into position by guiding or applying force to the panel assembly 100 until the panel assembly 100 covers the targeted openings 210 of the animal transportation vehicle 200. In the illustrated example, a user may lower the panel assembly 100 from above the animal transportation vehicle 200. A user may initially position them self above the animal transportation vehicle 200, for example on the roof 204. The panel assembly 100 is then arranged such that the first face 120 points away and the second face 130 points toward the exterior 202 of the animal transportation vehicle 200. The user may then align the first panel attachment array 160 with the first rail 230, such that the first rail 230 is received by the first channel 168. Simultaneously, the user may align the second panel attachment array 170 with the second rail 240, such that the second rail 240 is received by the second channel 178. The panel assembly 100 is subsequently lowered along rails 230, 240 until it completely covers the targeted openings 210 of the animal transportation vehicle 200. In addition, the panel assembly 100 may be lowered until it meets or is restricted from further movement by lip 250. In one or more examples of embodiments, the panel assembly 100 may be installed or attached to the animal transportation vehicle 200 from below, or from the second ends 234, 244 of the first and second rails 230, 240.

Referring specifically to FIG. 5, when the panel assembly 100 is completely installed or attached to the animal transportation vehicle 200, the second face 130 may engage or come into contact with the exterior surface 202 of the animal transportation vehicle 200. This covers the targeted openings 210 of the animal transportation vehicle 200.

The foregoing embodiments provide advantages over currently available devices. In particular the panel assembly and associated features described herein cover one or more openings of an animal transportation to limit or restrict the penetration of cold air, precipitation, and/or moisture into the interior of the animal transportation vehicle. This limits the potential negative impacts of animal exposure to the elements, including, but not limited to, animal comfort, and cold-related injuries, including, frostbite, hypothermia, or death. In addition, the panel assembly allows for fast and easy installation onto an animal transportation vehicle. For example, engagement of the first and second panel attachment arrays with the respective first and second rails provides fast and easy installation and attachment of the panel assembly with the animal transportation vehicle. This reduces the time investment necessary to install or attach one or more panel assembly to cover one or more opening in the animal transportation vehicle. Further, the panel assembly is biologically secure. The panel assembly includes a smooth surface that does not have open profiles or open areas or portions which would allow for the collection, accumulation or buildup of materials, including, but not limited to, biological or other waste material. Accordingly, the panel assembly provides biological security during the transportation of animals as there are no surfaces which allow for the accumulation or build up of biological material or contaminated material, including material which may include bacteria, infectious agents, disease, or other maladies. Thus, the panel assembly will not facilitate transmission of materials between animals, consumers of animals, or geographic locations. Further, the panel assembly is easy to clean. The perpendicular arrangement of bars to the first face and smooth surface of the second face of the panel assembly provides for no area or surface or closed profiles for the accumulation or buildup of materials, waste or debris. This enables complete and easy cleaning of the panel assembly. In addition, the panel assembly is light in weight, durable, yet includes sufficient structural stability and structural rigidity to allow for repeated use and ease of handling. The panel assembly includes a first thickness, allowing for the panel assembly to have a low overall total weight. Further, the one or more bars have a second thickness, which provides structural stability and structural rigidity along the panel assembly without the addition of excess weight. Accordingly, the panel assembly maintains an overall light weight, yet is structurally stable and has sufficient rigidity to allow for ease of handling. This allows the panel assembly to be attached to an animal transportation vehicle without adding excess weight which may result in a reduction of animal cargo or adversely effect operation of the vehicle.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references, including but not limited to, upper, lower, upward, downward, left, right, leftward, rightward, top, bottom, above, below, vertical, and horizontal are only used for identification purposes to aid the reader's understanding of the embodiments of the present invention, and do not create limitations, particularly as to the position, orientation, or use of the invention unless specifically set forth in the claims. Joinder references (e.g., attached, coupled, connected) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to certain embodiments, persons skilled in the art will recognize that changes may be made in form and detail without departing from the spirit and scope of the invention.

What is claimed is:

1. A wall panel cover assembly comprising:
   a first face having an outer perimeter and a second face having an outer perimeter, the second face being directly opposite the first face, at least the second face having a substantially smooth surface, and the first and second faces forming a first panel thickness;
   a plurality of borders surrounding the perimeters of the first and second faces;
   at least two support members attached to and arranged perpendicular to the first face, the at least two support members extending parallel to at least one border, the at least two support members and the second face forming a second panel thickness, the second panel thickness is greater than the first panel thickness; and
   the at least two support members spaced apart forming a plurality of spaced ribs;
   wherein said wall panel cover assembly is selectively removable from a transport vehicle.

2. The wall panel cover assembly of claim 1, wherein the at least two support members are integrally formed with the first face, and wherein the second face covers an existing wall panel on the transport vehicle.

3. The wall panel cover assembly of claim 1, wherein the plurality of borders include a first border and a second border, the first and second borders arranged parallel to each other.

4. The wall panel cover assembly of claim 3, wherein the plurality of borders include a third border and a fourth border, the third and fourth borders arranged parallel to each other.

5. The wall panel cover assembly of claim 4, wherein the third and fourth borders are arranged perpendicular to the first and second borders.

6. The wall panel cover assembly of claim 1, further comprising at least one panel attachment array forming a first channel.

7. The wall panel cover assembly of claim 6, wherein the panel attachment array includes a first attachment member and a second attachment member, the first and second attachment members arranged parallel to each other and being spaced apart by a third attachment member to form the first channel.

8. The wall panel cover assembly of claim 7, wherein the panel attachment array is a first panel attachment array and the wall panel cover assembly includes a second panel attachment array forming a second channel.

9. A wall panel cover assembly comprising:
   a panel having a first side and a second side, the first and second sides being directly opposed to each other and forming a wall of a first thickness;
   at least the second side having a substantially smooth surface;
   a first border extending along a first portion of a perimeter of the panel;
   a second border extending along a second portion of the perimeter of the panel, the second border parallel to the first border;
   a plurality of spaced apart support members integrally formed with and arranged perpendicular to the first side of the panel, the support members extending along the first side of the panel parallel to the first and second borders, the panel and support members forming a segment of a second thickness, the second thickness being greater than the first thickness;
   a first panel attachment array forming a first channel running along at least one of the plurality of borders;
   a second panel attachment array forming a second channel running along a second of the plurality of borders;
   said wall panel cover assembly selectively attachable to a transport vehicle by interfacing the first and second channels with corresponding rails on said transport vehicle; and
   said second surface of said wall panel cover assembly covering an existing wall of said transport vehicle.

10. The wall panel cover assembly of claim 9, wherein the panel attachment array includes a first attachment member parallel to a second attachment member, the first and second attachment members connected to and spaced apart by a third attachment member forming the first channel.

11. The wall panel cover assembly of claim 9, wherein the second panel attachment array includes a fourth attachment member parallel to a fifth attachment member, the fourth and fifth attachment members connected to and spaced apart by a sixth attachment member and forming the second channel.

12. The wall panel cover assembly of claim 9, wherein the channels are equal in thickness to the second thickness.

13. The wall panel cover assembly of claim 9, wherein the channels are greater in thickness than the second thickness.

14. The wall panel cover assembly of claim 9, wherein the panel is connected to an animal transportation vehicle by interfacing at least the first channel with a corresponding rail on the animal transportation vehicle and the second surface covers an existing wall portion of said animal transportation vehicle to block unwanted elements from said animal transportation vehicle.

15. A wall panel assembly comprising:
   a panel having a front face and a rear face having an outer perimeter, a first border and a second border, the first and second borders arranged parallel to each other, the front and rear faces opposing each other, at least the rear face having a substantially smooth surface, the panel having a first thickness formed between the front and rear faces;
   a plurality of protrusions integrally formed and arranged perpendicular to the front face of the panel, the protrusions extending along the front face of the panel parallel to the first and second borders, each of the plurality of protrusions spaced apart from each other;
   a segment of the panel having a second thickness formed between the rear face and a protrusion, the second thickness greater than the first thickness;
   at least one panel attachment array having a first attachment member parallel to a second attachment member, the first and second attachment members connected to and spaced apart by a third attachment member forming a first channel;
   a second panel attachment array forming a second channel; and
   wherein said wall panel assembly is removably connected to an animal transportation vehicle and said rear face of said wall panel assembly is opposite and adjacent to an existing wall structure of said animal transportation vehicle to impede unwanted elements from the interior of said animal transportation vehicle.

16. The wall panel assembly of claim 15, further comprising:

said second panel attachment array having a fourth attachment member parallel to a fifth attachment member, the fourth and fifth attachment members connected to and spaced apart by a sixth attachment member forming said second channel.

17. The wall panel assembly of claim 15, wherein the panel is connected to an animal transportation vehicle by sliding the first and second channels to receive corresponding rails having complementary channels on the animal transportation vehicle.

18. The wall panel cover assembly of claim 6, wherein the channel of the panel assembly receives a corresponding interface rail on an animal transportation vehicle when the panel assembly is mounted thereon.

19. The wall panel cover assembly of claim 8, wherein the channels of the panel assembly receive corresponding interface rails on an animal transportation vehicle when the panel assembly is mounted thereon.

20. The wall panel cover assembly of claim 7, wherein the second attachment member comprises one of the plurality of borders of the wall panel.

21. The wall panel cover assembly of claim 7, wherein the third attachment member comprises a discrete member connecting the first and second attachment members.

\* \* \* \* \*